United States Patent [19]

LaBelle et al.

[11] 4,390,678
[45] Jun. 28, 1983

[54] ONE-PACKAGE HEAT CURABLE AROMATIC POLYURETHANE COMPOSITION USEFUL FOR JOINING SUBSTRATES AND AS AN IN-MOLD COATING COMPRISING AN ISOCYANATE TERMINATED PREPOLYMER AND A POLYHYDROXY COMPOUND

[75] Inventors: Stanley B. LaBelle, Anoka; James A. E. Hagquist, St. Paul, both of Minn.

[73] Assignee: H. B. Fuller Company, St. Paul, Minn.

[21] Appl. No.: 337,623

[22] Filed: Jan. 7, 1982

[51] Int. Cl.³ ............................................. C08G 18/10
[52] U.S. Cl. .................................... 528/60; 156/242; 156/308.6; 156/331.4; 264/161; 264/163; 528/65; 528/66
[58] Field of Search ........................... 528/60, 65, 66; 156/242, 308.6, 331.4; 264/161, 163

[56] References Cited

U.S. PATENT DOCUMENTS

| | | | |
|---|---|---|---|
| 3,351,573 | 11/1967 | Skreckoski | 528/58 |
| 3,488,302 | 1/1970 | Pyron | 528/271 |
| 3,549,569 | 12/1970 | Farah et al. | 528/44 |
| 3,691,135 | 9/1972 | Schulze et al. | 528/44 |
| 3,725,355 | 4/1973 | Parrish et al. | 528/55 |
| 4,072,649 | 2/1978 | Kubens | 264/239 |
| 4,076,679 | 2/1978 | Turner | 528/73 |
| 4,076,788 | 2/1978 | Ditto | 264/255 |
| 4,080,401 | 3/1978 | Kassner | 428/413 |
| 4,194,940 | 3/1980 | Damico et al. | 156/331.4 |

OTHER PUBLICATIONS

"SME Adhesives in Manufacturing", Houston, Texas, Sep. 15-17, 1981, Urethane Structural Adhesives.

Primary Examiner—Maurice J. Welsh
Attorney, Agent, or Firm—Merchant, Gould, Smith, Edell, Welter & Schmidt

[57] ABSTRACT

A one-package heat curable polyurethane composition, comprising an isocyanate terminated prepolymer liquid phase and a separate solid polyhydroxy compound phase insoluble in the prepolymer phase, and suitable for use as an adhesive. The liquid prepolymer phase comprises the reaction product of an aromatic polyisocyanate and a polyhydroxy compound. The separate insoluble solid polyhydroxy compound phase is dispersed or suspended throughout the liquid prepolymer phase and remains separate until heat cured. The ratio of OH groups in the solid polyhydroxy compound phase to NCO groups in the isocyanate terminated prepolymer liquid phase is less than 2:1. The one-package polyurethane adhesive composition can also be useful as an in-mold coating and an injection molding compound.

29 Claims, No Drawings

ONE-PACKAGE HEAT CURABLE AROMATIC POLYURETHANE COMPOSITION USEFUL FOR JOINING SUBSTRATES AND AS AN IN-MOLD COATING COMPRISING AN ISOCYANATE TERMINATED PREPOLYMER AND A POLYHYDROXY COMPOUND

FIELD OF THE INVENTION

This invention relates to a one-package aromatic heat curable polyurethane composition, suitable for use as an adhesive, that when cured has excellent structural integrity, high bonding and tensile strength, and resistance to heat. The heat curable polyurethane composition is also suitable for use as an in-mold coating for composite substrates and as an injection molding compound.

BACKGROUND OF THE INVENTION

One-package polyurethane compositions are known in the art. One example is Pyron, U.S. Pat. No. 3,488,302, which discloses a curable one-part polyurethane composition comprising a polyisocyanate prepolymer and pentaerythritol wherein the ratio of pentaerythritol hydroxyls to prepolymer isocyanate groups is greater than 2:1, and preferably greater than 5:1. In our efforts to find a suitable one-part polyurethane adhesive we prepared compositions substantially as disclosed in Pyron and found that upon curing they were "cheesy" and failed to have the mechanical integrity, bonding strength and tensile strength required in an acceptable adhesive.

Our experience with one-package polyurethane adhesives disclosed in Pyron is reflected in the industry's rejection of one-package polyurethane adhesives in favor of two-package polyurethane compositions. Two-package polyurethane adhesives commonly are available as systems having components that are stored separately and are mixed immediately prior to application. These adhesives are used in product assembly, for example, in the assembly of automobile components, using equipment that automatically and accurately mixes the two components to optimize bond strength and other properties. Before a production run is begun the mixing equipment is pre-calibrated to mix the precise amounts of components at a ratio that produces a polyurethane adhesive having optimum properties. During the production run adhesive is continuously produced and applied. If the flow of adhesive is shut off, the mixing chamber and other parts of the mixing equipment must be solvent-flushed to remove the active polyurethane components. After solvent flushing the mixing equipment must be recalibrated to insure that the components are mixed at the correct ratio. A great deal of adhesive is often wasted during the production runs since the mixing machinery continuously prepares adhesive. As much as two-thirds of the adhesive or more can be lost in this manner. The time, labor and equipment required for mixing the two-part adhesive results in the waste of time, effort, and capital.

Accordingly a need exists for a one-package polyurethane composition that can be heat-activated or heat-cured to a structurally solid mass providing bond and tensile strength, heat, chemical and moisture resistance suitable for automotive component assembly.

BRIEF DESCRIPTION OF THE INVENTION

We have discovered a storable one-package, heat curable polyurethane composition that is heat activated to a structurally solid mass which exhibits exceptional bond and tensile strength, heat, moisture and chemical resistance, which comprises a substantially liquid isocyanate-terminated prepolymer phase and a solid polyhydroxy compound phase insoluble in the prepolymer phase. The isocyanate-terminated prepolymer phase comprises the reaction product of a polyisocyanate compound and a polyhydroxy compound. The solid polyhydroxy compound phase (curing agent) comprises a polyhydroxy compound which is dispersed or suspended throughout the prepolymer phase and remains a substantially insoluble, unreactive separate phase until the adhesive is heat activated.

The OH/NCO ratio, the ratio of OH groups in the solid insoluble polyhydroxy compound phase to NCO groups in the liquid isocyanate-terminated prepolymer phase, can be less than about 2:1 to produce a useful adhesive. Preferably, the OH/NCO ratio can be from about 0.5:1 to 1.8:1 and most preferably, for reasons of optimum structural integrity, bond and tensile strength, the ratio can be from about 0.8:1 to 1.5:1. The close control of the OH/NCO ratio is critical to obtaining the optimum properties of the cured polyurethane adhesive.

We have found that the adhesives of this invention are efficient to use, lightweight and strong. We have found that the adhesives of this invention can be beneficially used in the assembly of vehicles. Plastic and composite materials are being used to replace metals and will be used in greater amounts in the future. The one-package polyurethane can be used to join these materials to like materials or to dissimilar materials. One composite material commonly used in vehicle components is called sheet molding compound (SMC) which generally comprises a fiberglass reinforced polyester. The polyurethane adhesive composition of this invention is particularly well suited to bonding SMC to itself or to a variety of other substrates. In bonding SMC to metallic substrates, we have found that the polyurethane adhesives of this invention are particularly useful. Sheet-molding compound commonly has a higher coefficient of expansion than metallic substrates, and as components comprising metal joined to SMC heat and cool, the metal tends to expand and contract to a lesser degree than SMC placing substantial amounts of stress on the adhesive. The inherent flexibility and strength of the one-package polyurethane adhesive is well suited to forming bonds that resist failure due to this stress.

We have also found that the polyurethane composition can be used in in-mold processes to repair imperfections common in sheet molding compound. Sheet molding compound is made by charging fiberglass and polyester resin into a mold. During the molding process, small gaps can be left in the surface of the SMC. It is common to fabricate sheet molding compound into vehicle components such as fenders or doors, and after the assembly of a vehicle is complete, to fix the imperfections in the components by hand. This process is expensive and slow.

We have found that the imperfections in sheet molding compound can be filled during an in-mold process using the polyurethane composition of this invention. Sheet molding compound is made by embedding glass fibers into a polyester resin in a suitable mold. After the mold is opened, a sufficient imperfection filling amount of the polyurethane adhesive is applied to sheet molding compound. The mold is closed in such a way that the SMC is not crushed, forcing the composition into the imperfections and producing a smooth finish.

We have also found that the polyurethane adhesives of this invention can serve as a replacement for plastisols and body solders in automotive component assembly. The polyurethane adhesive compositions of this invention can be used with a primer applied to the substrate prior to the application of the composition.

DETAILED DESCRIPTION OF THE INVENTION

Polyurethane compositions are substantially polymeric substances which contain an -NHCOO- or -NHCO$_2$- radical, known as a urethane group. The fundamental reaction in the field of urethane chemistry is the reaction of an isocyanate with an alcohol, as follows: $R.NCO + R'OH \rightarrow R.NH.CO_2R'$. In the reaction between the isocyanate group and the hydroxyl group, a bond is formed between the hydroxyl oxygen atom and the isocyanate carbon atom, and the active hydrogen of the hydroxyl or OH group is transferred to the nitrogen of the isocyanate or NCO group. When the alcohol is a polyfunctional alcohol, which may be a long-chain or polymeric compound with a multiplicity of hydroxyl groups, such as a polyester or polyether, and the isocyanate is a polyisocyanate, the reaction produces polyurethane according to the following reaction: $nHO.R.OH + nOCN.R'.NCO = H-[-O.R.OOC.HN.R'-]_n-NCO$. When the polyisocyanate has more than one NCO group (a functionality greater than 1) and the polyhydroxyl reactants have a more than two OH groups (functionality greater than 2), the polyurethane can be crosslinked. The physical properties of the polyurethane will depend largely upon hydroxy or isocyanate functionalities, average molecular weights of the polyhydroxy compounds and isocyanates, ratio of hydroxyl to isocyanate groups, and the other functional groups of the reactants, all of which can be varied to give a polyurethane with characteristics suitable for a particular use.

In the preparation and use of the one-package heat curable polyurethane of this invention, two general chemical reactions take place. First, a polyhydroxy compound or polyol reacts with a polyisocyanate to produce an isocyanate terminated liquid prepolymer phase. Second, after the isocyanate terminated liquid prepolymer phase is combined with a solid insoluble polyhydroxy compound phase to form the one-package adhesive, the liquid prepolymer phase reacts with the separate insoluble polyhydroxy compound phase comprising a solid polyhydroxy compound or polyol, at an elevated activating temperature, to form the cured solid adhesive. An insoluble phase is necessary to reduce the reactivity of the curing agent to prevent substantial gelling or hardening during storage.

PREPOLYMER POLYHYDROXY COMPOUNDS

Polyhydroxy compounds suitable for forming the isocyanate terminated prepolymer produced in the first reaction comprise molecules having at least two hydroxyl groups attached to an organic backbone comprising an alkyl, alkylene, polyester, polyether, polyactone, or the like. Blends and mixtures of these polyhydroxy compounds or polyols may also be used.

These polyhydroxy compounds of the prepolymer can be fluid at room temperature and can have a molecular weight and hydroxy functionality which will result in a prepolymer of manageable viscosity. Typically, a suitable polyhydroxy compound can have a molecular weight less than 20,000, more typically less than 5,000 or 10,000, preferably the range of molecular weight of the polyhydroxy compound, for reasons of optimum viscosity and reactivity can range about 500 to 3,000. The hydroxyl functionality will typically range from 2 to 6. Higher hydroxyl functionality often results in a prepolymer of unacceptably high viscosity.

The prepolymer polyhydroxy compounds are commonly made by reacting a nucleus having active hydrogens with an alkylene oxide compound. The functionality of the resulting polyhydroxy compound can be varied over a wide range by selecting a monomeric (one active hydrogen) nucleus or a polymeric (more than one active hydrogen) hydrogen-containing nucleus. Active hydrogen atoms can be found in active hydrogen-containing substituents such as OH, NH, COOH, and SH groups. In building a polyhydroxy compound, if the desired hydroxy functionality of a the polyhydroxy compound is 2, the nucleus can comprise water, glycol, and the like. If the desired functionality is 3, the nucleus can comprise glycerine, trimethylol propane, triethanol amine, and the like. For a polyhydroxy compound having a functionality of 4, the nucleus can comprise ethylene diamine or other primary diamines. For a higher functionality, the nucleus can comprise hydroxy-containing oils, carbohydrates or carbohydrate derivatives having one or more saccharide or saccharide-like units, and the like.

Suitable alkylene oxide compounds for reaction with the hydrogen donor nucleus compound to form the polyhydroxy compound include such compounds as ethylene oxide, 1,3-butylene oxide, 1,2-propylene oxide and epichlorohydrin.

The preferred polyhydroxy compounds or polyols for the prepolymer of this invention generally will have an average hydroxy functionality greater than about 2, giving a prepolymer with an average isocyanate functionality greater than about 2 and an average molecular weight from about 500 to 15,000, resulting in a workable viscosity. Examples of preferred polyhydroxy compounds include commercial polyoxyalkylenes having at least two terminal hydroxyl groups in the molecule, such as polyethylene glycols, polypropylene glycols, or polybutylene glycols, hydroxyl containing polyesters, hydroxyl containing polyesteramides, polyalkylene ether glycol compounds, polyoxyalkylene compounds, castor oil, tung oil and their alkyd modifications, dihydroxy terminated polyesters produced, for example, by esterification of adipic acid, sebacic acid, and other dicarboxylic acids with long chain polyoxyalkylene glycols, and polyepsilon caprolactonediols. The most preferred hydroxyl containing compounds are the polyoxyalkylene diols or triols of the proper molecular weights, for reasons of their low cost, reactivity and availability.

One embodiment of the most preferred polyhydroxy compounds is the "Poly-G ®" polyether polyol series of diols and triols by Olin Chemicals. The diols comprise polyoxypropylene glycols and the triols comprise polyoxypropylene adducts of glycerine, both having for the most part secondary hydroxyl groups. Average hydroxyl numbers (mgKOH/g) for this series of polyols range from 28 to 274. Average equivalent weights range from about 200 to 2,000. Average formula molecular weights for this series of polyols range from 615 to 4,000.

Another embodiment of the preferred polyhydroxy compounds which can give very good strength and chemical resistance comprises a polycaprolactone compound. For example, polyepsilon caprolactone diols having a molecular weight of about 500 to 2,000, a hydroxy functionality of about 2, a theorectical hydroxyl number of about 56 to 212, and an equivalent weight of about 260 to 1,000, can give excellent strength and chemical resistance to the cured polyurethane composition, and can be used when very high strength justifies the high cost.

Polyisocyanate Compounds

The polyisocyanate compounds suitable for forming the osicyanate terminated prepolymer include any organic aromatic polyisocyanates having an isocyanate functionality of about two or greater and at least 1 aromatic group. The polyisocyanate in this invention may have any number of aromatic groups, the number typically ranging from 1 to 10, preferably for reasons of reactivity and low cost, the polyisocyanate compounds can have from 2 to 3 aromatic groups. The polyisocyanate may also contain other substituents which will not substantially adversely affect the isocyanate terminated prepolymer or the adhesive properties of the ultimately obtained, heat cured one-part aromatic polyurethane composition. The polyisocyanate compound can also comprise a mixture of aromatic and aliphatic isocyanates.

Typical aromatic polyisocyanates include diphenylmethane diisocyanate compounds (MDI), including its isomers, diphenylmethane 4,4'-diisocyanate, diphenylmethane 2,2'-diisocyanate, diphenylmethane 2,4' diisocyanate and mixtures thereof; toluene diisocyanate compounds (TDI), including 2,4-toluene diisocyanate, and 2,6-toluene diisocyanate and mixtures thereof; isomers of naphthalene diisocyanate, isomers of triphenylmethane triisocyanate, and mixtures thereof. For a one-package polyurethane which resists gasing and cures to a desirable strength, the polyisocyanate will be a diisocyanate having an average functionality from about 1.5 to 3.0 where a fractional functionality can arise by mixing isocyanates of different functionalities. For optimum strength and resistance to gasing, the diisocyanate will have a functionality of 2. The MDI and TDI aromatic diisocyanates preferred for use in this invention, for reasons of availability and level of reactivity, comprise diphenylmethane 2,4'- and 4,4'-diisocyanate, and 2,6- and 2,4-toluene diisocyanate and mixtures thereof. These diisocyanates are commercially available at relatively low cost and can produce polyurethanes with excellent strength, toughness, durability, and resistance to gasing.

Separate Polyhydroxy Compound or Curing Agent Phase

The separate polyhydroxy compound phase or curing agent phase useful for preparing the one-package polyurethane comprise a solid polyhydroxy compound substantially insoluble in the liquid prepolymer which can be dispersed or suspended throughout the prepolymer phase and maintained in the dispersed or suspended state at room temperature, until the one-package adhesive is heat-activated and cured. The preferred polyhydroxy compounds of the separate phase are finely divided solid polyols with at least two OH groups attached to an organic backbone, having melting points at or above the preferred curing temperatures. Typically, to achieve the desired level of crosslinking and hardness in the cured polyurethane adhesive, the polyhydroxy compound of the separate phase will have from 2 to 6 hydroxyl groups.

As pointed out above, the solid compounds selected for admixture with the prepolymers should have an appropriate hydroxyl functionality and should have a melting point above the curing temperature. If during storage and before use, the melting point of the solid is exceeded, the system can begin to cure. In general, a melting point above 130° F. (54° C.) is desirable. However, since temperatures on the order of 225° to 400° F. (107° C. to 204° C.) are frequently employed in effecting curing, the preferred compounds have melting points in the range of 230°-410° F. (110°-210° C.). In general, the solid compound should be finely divided, about 325 mesh or smaller, to promote dispersion in the fluid prepolymer phase.

Examples of solid polyhydroxy compounds include commercial pentaerythritol, dipentaerythritol, tripentaerythritol, and mixtures thereof, the methyl alpha d-glucoside of corn starch, (which is a tetrahydroxy compound) corn starch, sucrose (M.P. 170° C.), lactose (M.P. 202° C.), d-mannitol (M.P. 166° C.), anhydrous sorbitol (M.P. 112° C.), dulcitol (M.P. 188.5° C.) and erythritol (M.P. 120° C.). Other solid polyhydroxy compounds, such as copolymers of vinyl ester with ethylenic unsaturated compounds having three or more ester groups replaced by hydroxyl groups can be used.

The preferred polyhydroxy compound for use in this invention, for reasons of low cost, stability, and reactivity during curing, comprises pentaerythritol, a crystalline, ordorless, white, nonhygroscopic, practically nonvolatile, tetrahydric neopentyl alcohol of the formula 2,2-bis(hydroxymethyl)-1,3-propanediol. Pentaerythritol can be made by the condensation of formaldehyde and acetaldehyde. It is available commercially, for example, as Hercules ® PE-200, a product of Hercules, Incorporated. Its melting point has been reported from 260° C. to 262° C.

Pentaerythritol can be used with its dimers, trimers, and other isomers, its esters and the esters of its dimers and trimers, and mixtures thereof.

Plasticizers can be used in the invention which can improve the viscosity and bubble release of the uncured adhesive and the hardness, flexual modulus, and cure time of the cured adhesive. Often a single plasticizer will suffice to impart desired properties to the uncured one-package polyurethane and to the cured composition, although in certain instances two or more plasticizers can be advantageous. Plasticizers suitable for use in urethane formulations are common including commercial plasticizers, phthalates, phosphates, chlorinated biphenols and polyphenols, aromatic oils, chlorinated waxes or paraffins, adipates, synthetic rubber polymers, long oil derived from linseed oils and wood rosins, and polysulfite rubber. Normally, the amount of plasticizer will range from about 1% by weight of solids in the polyurethane to about 25% in order to obtain good dispersion of the curing agent phase. Plasticizers preferred for use in this invention include N-ethyl toluene sulfonamide and diisodecylphthalate (DIDP), because they are readily available at relatively low cost. In addition, N-ethyl toluene solfonamide is particularly useful in this invention as an aid in the introduction and dispersions of solids throughout the prepolymer, while DIDP works especially well to reduce viscosity.

As is known in the art, fillers, extenders, plasticizers, thickeners, catalysts, pigments, and the like can be included in the polyurethane composition. Neutral fillers are ordinarily preferred in order to avoid gasing during storage. Highly alkaline materials may have an undesired catalytic effect. Highly acidic materials may attack the urethane or carbamate linkages in the prepolymer.

A thickener or thixotrope will normally comprise at least about 1% by weight of the one-package aromatic polyurethane where the polyurethane is to be used as an adhesive, in-mold coating, or injection molding compound. Silicone-modified hydrophobic silica is typically used as the thickener or thixotrope. CAB-O-Sil TS 200 (trademark of the Cabot Corporation), a hydrophobic inorganic fumed silica powder of very low bulk density having a specific gravity of 1.8 and a surface area of $70\pm15$ m$^2$/g. which has been modified by treatment with an organic silicone compound can be used.

A water binding agent or moisture scavenger or molecular sieve will generally be added to protect against carbon dioxide formation and other undesired side reactions. For example, SYLOID ZN-1 of the formual $Na_2O:Al_2O_3:2.8SiO_2:XH_2O$, a finely divided, white, inorganic, dehydrating agent with a moisture absorption as high as 36% by weight, a density of 30 pounds per cubic foot, and a specific gravity of 2.13, available commercially through Grace Davison Chemical, may be added to reduce gasing during the cure cycle. Some inorganic agents such as calcium oxide are ordinarily not preferred because of their alkalinity.

Catalysts that reduce shelf life can be included in the one-package polyurethane in order to obtain faster curing. However it is preferred to omit them.

In somewhat greater detail, the one-package polyurethane composition can be made by a process divided into three stages. The first stage comprises the formation of the substantially liquid prepolymer phase, the second stage comprises the formation of the solid polyhydroxy compound (curing agent) phase and the third stage comprises the formation of the one-package adhesive by blending the prepolymer phase with the insoluble polyhydroxy compound phase.

PREPOLYMER PREPARATION

The first stage involves the formation of the liquid prepolymer phase by reacting the polyisocyanate compound and a suitable polyhydroxy compound. In forming the prepolymer, the polyisocyanate compound should be in liquid form. If the isocyanate is not a liquid at room temperature, it can be heated and maintained at a temperature sufficiently above its melting point to maintain its liquidity during handling and reaction with the polyhydroxy compound. Commonly, the polyisocyanate compound can be heated and maintained at about 150°-170° F. (65°-77° C.) prior to reaction with the polyhydroxy compound. The polyisocyanate can be charged into a reactor suitable for large-scale production and placed under vacuum in the reaction vessel. For polyhydroxy compounds with a functionality of two, about 0.4-0.6 moles of the polyhydroxy compound can be added per mole of the polyisocyanate compound. For polyhydroxy compounds with a functionality of three, about 0.25-0.4 moles of the polyhydroxy compound can be added per mole of the polyisocyanate compound. The polyhydroxy compound can be added slowly at a rate keeping the temperature at a level to maintain workable viscosity, commonly about 160°-180° F. (71°-82° C.). After the polyhydroxy compound addition, the mixture can be held at about 160°-180° F. (71°-82° C.) or greater for about 30 minutes or greater to drive the reaction toward completion. Often, the temperature can rise to about 180° F. (82° C.) or greater due to the exothermic nature of the reaction between the isocyanate and the polyhydroxy compound.

After the polyhydroxy compound has been reacted with the polyisocyanate, the resulting prepolymer can have an average isocyanate functionality greater than 1 and ranging up to about 6 depending on the functionality of the polyhydroxy compound, and can have an average molecular weight of up to about 20,000. For reasons of a more workable viscosity, the average isocyanate functionality of the prepolymer will be about 4 or less with an average molecular weight less than about 15,000.

The mixture can be held under a vacuum in order to remove moisture and monomeric materials and prevent absorption of atmospheric constituents. After about 2 hours, the vacuum can be broken with dry nitrogen. The prepolymer reaction product can be titrated to insure the concentration of NCO in the prepolymer is within about 12 to 13% (according to ASTM D 2572-80 "Standard Test Method for Isocyanate Groups in Urethane Materials or Prepolymers"). If the composition has an acceptable NCO level, it can be packaged in a suitable container, purged with dry nitrogen, sealed, and set aside to cool.

CURING AGENT PHASE PREPARATION

In the second stage, the curing agent phase or premix is formed. Into any suitable container sufficient plasticizer is charged to disperse the solid polyhydroxy compound curing agent, the molecular sieve, and the other components. Commonly about 0.5 to 2.5 parts of plasticizer and 0.1 to 1.0 parts of molecular sieve can be used per part of polyhydroxy compound. Other desired pigments, fillers, extenders, dyes, can also be charged at this time. The container can be connected to a mixer having high shear and can be blended until a Hegman value of 5 units is obtained, or until the polyhydroxy compound phase is well dispersed. During the blending, the temperature generally rises, to about 140° F. (60° C.). After blending, the material or premix can be poured or pumped into a suitable container, purged with dry nitrogen, sealed, and allowed to cool to room temperature. The molecular sieve must be allowed to absorb moisture from the curing agent phase, before the prepolymer phase and the curing agent phase are mixed, to prevent the reaction of moisture with the urethane groups.

FORMING THE ONE-PACKAGE COMPOSITION

In the third stage, the on-package composition is made by combining the curing agent phase with the prepolymer phase at a ratio of less than 2 equivalents of —OH in the curing agent phase per equivalent of —NCO in the prepolymer phase, along with optional thixotrope, plasticizer, or the like needed to adjust viscosity or other properties. These components can be charged to an enclosed mixer under a vacuum preferably above 28 inches (711 millimeters) Hg for sufficient time in order to remove moisture, atmospheric gases, and the like. After this time, the mixer can be started and the materials agitated at a reasonable speed, continuously under vacuum until well mixed. Optionally, the vacuum can be broken with dry nitrogen, the sides of the container and the mixing blades scraped, the mixer again closed, the vacuum applied, and the materials can again be well mixed. The vacuum can again be broken with dry nitrogen, the contents of the mixer dumped into a drum or other suitable storage container, purged with dry nitrogen, and sealed.

The one-package aromatic polyurethane of this invention can be applied as an adhesive using common industrial adhesive equipment, can be molded using common industrial injection or other molding equipment, and can be applied as an in-mold coating using common industrial molds and processes.

The one-package polyurethane must undergo a substantial heat curing step in order for it to obtain the desirable properties described previously, for example, exceptional bonding and tensile strength. The time and temperature required for this curing step can vary according to the nature of the substrates, the amount of polyurethane used, the nature of the heating means, and the like. However, the important criterion is the temperature of the adhesive at the bond line. At the bond line the adhesive must reach a sufficient curing temperature for a sufficient time to form a strong bond. Further, the cure cycle should not be interrupted with the expectation of completing the cure cycle at a later time.

Normally, the curing temperatures are below 350° C. (632° F.), and typically they are within the range of 85°–300° C. (185°–572° F.). Normally, no significant curing is carried out at temperatures below 60° C. (140° F.), and rarely is the curing temperature as low as 85° C. (185° F.). At 300° C. curing can be complete in about two minutes or less, while at lower temperatures, curing times can be longer.

The following specific examples which include the best mode were prepared and tested as described.

EXAMPLE I

PREPARATION OF THE PREPOLYMER

Into a 2000 ml four neck reaction flask equipped with agitator, thermometer, addition funnel, vacuum, heating and cooling capabilities, was charged 900 g. solid diphenylmethane-4,4'-diisocyanate (e.g. Isocyanate 125 M) which was heated and maintained at about 140° F. (60° C.) until liquid. The reaction flask was connected to a vacuum pump creating a vacuum of about 28" (711 mm) Hg in the flask. To the heated contents was slowly added, with stirring, at a rate keeping the temperature below 160° F. (71° C.), 900 g. of a polyether triol, comprising a polyoxypropylene adduct of glycerine (1,2,3-trihydroxypropane), having three secondary hydroxyls and a molecular weight of about 1500, (Polyol 30–112 by Olin Chemicals). After the polyether triol was added, the temperature of the reaction flask, which was increasing because of the exothermic reaction between the diisocyanate and the polyether triol, was permitted to reach about 180° F. (82° C.). The reactants were held at about 180° F. (82° C.) for about two hours in order to complete the reaction and under vacuum to remove moisture and monomeric materials. After about 2 hours, the vacuum was broken with dry nitrogen. The prepolymer was poured from the reaction flask into a storage container, purged with dry nitrogen, sealed, and allowed to cool at room temperature.

PREPARATION OF THE CURING AGENT PHASE

The curing agent phase was formed separately from the prepolymer. Into a one-gallon can was charged 470 g. liquid plasticizer N-ethyl toluene sulfonamide (Santicizer 8), 470 g. finely divided solid pentaerythritol (PE-200), and 60 g. molecular sieve Syloid ZN-1, a finely divided, white, inorganic, dehydrating agent with a moisture adsorbtion as high as 36% by weight, density of 30 pounds per square foot, and specific gravity of 2.103. These compounds were sheared at high speed in a Cowles disolver until the solids were thoroughly dispersed into the liquid plasticizer. The curing agent phase was poured into a storage container, purged with dry nitrogen, sealed, and allowed to stand at room temperature for about two days in order to allow the molecular sieve to absorb moisture.

PREPARATION OF THE ONE-PACKAGE POLYURETHANE

After the liquid prepolymer and the solid polyhydroxy compound phase had been formed, 356 g. of the prepolymer phase and 113 g. of the polyhydroxy compound phase were combined in a planetary mixer along with 10 g. additional plasticizer diisodecyl phthalate (DIDP), and 40 g. thixotrope TS-200, a hydrophobic inorganic fumed silica powder of very low bulk density having a specific gravity of 1.8, a surface area of 70±15 $m^2/g$ and a surface modified by treatment with an organic silicone compound. The closed planetary mixer was placed under vacuum of about 28" (711 ml) for about 15 minutes in order to pull off moisture, gases and the like. Still pulling a vacuum of about 28" (711 ml) Hg, the planetary mixer was started and the contents were agitated for about 30 minutes at a reasonable speed. The vacuum was broken with dry nitrogen, the walls and mixing blades of the planetary mixer were scraped down, and the mixture was again agitated under vacuum of about 28" (711 mm) Hg for another 30 minutes to insure thorough mixing. The vacuum was broken with dry nitrogen, and the finished one-package polyurethane composition was discharged into storage containers, purged with dry nitrogen, and sealed.

In the one-package heat curable polyurethane of Example I, the ratio of OH groups in the solid polyhydroxy compound phase to NCO groups in the prepolymer phase was about 1.2:1. The bonding strength of the adhesive of Example I was tested using an Instron tester. To primed coupons of sheet molding compound (with dimension of 1×4×0.125") was applied the adhesive of Example I. The coupons were joined through the adhesive and the bond was cured at 300° F. (149° C.) for 20 minutes. Samples were tested under procedures and conditions typical in automotive production, and the tests were based on automotive industry specifications. The test results were as follows:

INSTRON TESTER, CROSSHEAD SPEED 1 INCH/MINUTE, TESTED AT 410 TO 640 PSI

Room Temperature—SUBSTRATE FAILED
24 Hour Boilng Water—SUBSTRATE FAILED
Cycled Twice 400° F. (204° C.) for 30 minutes per cycle—SUBSTRATES FAILED

HIGH TEMPERATURE TESTS

180° F. (82° C.)—ADHESIVE FAILED AT 280 PSI
200° F. (93° C.)—ADHESIVE FAILED AT 267 PSI

These test results show that the cured polyurethane composition can withstand conditions much more rigorous than those to which it would normally be subjected in use. Where the results indicate that the substrate failed the SMC coupon yielded to the stress, while the adhesive did not yield. The high temperature test results shown that at high temperatures the cured one-package polyurethane adhesive failed only when subjected to stresses well above most automobile industry standards (about 180 p.s.i.).

EXAMPLE II

PREPARATION OF THE PREPOLYMER

The preparation of the prepolymer in Example I was repeated except that 300 g. of a mixture of about 800 parts of 2,4'-toluene diisocyanate and 20 parts of 2,6'-toluene diisocyanate was used in place of the MDI, and 700 g. of a polyether diol comprising a polyoxypropylene glycol having two secondary hydroxyls and an average molecular weight about 1,000, (Poly G 20–112) was used in place of the triol in Example I.

PREPARATION OF THE CURING AGENT PHASE

The preparation of the curing agent phase in Example I was repeated.

PREPARATION OF THE ONE-PACKAGE POLYURETHANE

The preparation of the one-package polyurethane in Example I was repeated except that 720 g. of the prepolymer of Example II, 140 g. of the curing agent phase of Example II, 50 g. plasticizer N-ethyl o, p-toluene sulfonamide (Santicizer 8), and 70 g. thixotrope TS-200 were used instead of the components in Example I. The OH/NCO ratio of the final product or one-package heat curable polyurethane composition of Example II was 1.2:1. Typical properties of the heat cured adhesive of Example II were good tear strength, flexibility, and tensile strength.

The foregoing Examples and discussion is a description of the invention. However, since many embodiments can be made without departing from the spirit and scope of the invention, the invention resides in the claims hereinafter appended.

What is claimed is:

1. A one-package aromatic heat curable polyurethane composition which comprises:
   (a) a substantially liquid aromatic isocyanate terminated prepolymer phase comprising the reaction product of an aromatic polyisocyanate compound, and a polyhydroxy compound; and
   (b) a separate solid polyhydroxy compound phase, comprising a solid polyhydroxy compound having two or more hydroxyl groups that is insoluble in and dispersed throughout the substantially liquid isocyanate terminated prepolymer phase;
wherein the ratio of OH groups in the solid insoluble polyhydroxy compound phase to the NCO groups in the substantially liquid isocyanate terminated prepolymer phase is less than 2:1.

2. The composition of claim 1 wherein the ratio of OH groups in the solid insoluble polyhydroxy compound phase to NCO groups in the substantially liquid isocyanate terminated prepolymer phase is 0.5:1 to 1.8:1.

3. The composition of claim 1 wherein the ratio of OH groups in the solid insoluble polyhydroxy compound phase to NCO groups in the substantially liquid isocyanate terminated prepolymer phase is 0.8:1 to 1.5:1.

4. The composition of claim 1 wherein the solid polyhydroxy compound phase comprises a solid polyhydroxy compound having 2 to 6 hydroxyl groups, and in the prepolymer phase the aromatic polyisocyanate compound has an isocyanate functionality of greater than one.

5. The composition of claim 4 wherein the solid polyhydroxy compound is finely divided.

6. The composition of claim 5 wherein the solid polyhydroxy compound comprises pentaerythritol.

7. The composition of claim 4 wherein the solid polyhydroxy compound comprises an ester or a mixture of esters of pentaerythritol having a hydroxyl functionality of about 2 or greater.

8. The composition of claim 5 wherein the solid polyhydroxy compound comprises dimers and trimers of pentaerythritol and mixtures thereof.

9. The composition of claim 1 wherein, in the prepolymer phase, the aromatic polyisocyanate compound comprises an aromatic diisocyanate.

10. The composition of claim 9 wherein the aromatic diisocyanate comprises a diphenylmethane diisocyanate compound or a toluene diisocyanate compound.

11. The composition of claim 10 wherein the diphenylmethane diisocyanate compound comprises diphenylmethane-2,2'-diisocyanate, diphenylmethane 2,4'-diisocyanate, diphenylmethane-4,4'-diisocyanate, or mixtures thereof and the toluene diisocyanate compound comprises a 2,4-toluene diisocyanate, 2,6-toluene diisocyanate, or mixtures thereof.

12. The composition of claim 1 wherein, in the isocyanate terminated liquid prepolymer phase, the polyhydroxy compound comprises a compound having a substantially organic backbone, and 2 to 6 hydroxyl groups, wherein the backbone is selected from the group consisting of alkyls, alkylenes, polyesters, polyethers and polyactones.

13. The composition of claim 1 wherein, in the isocyanate terminated liquid prepolymer phase, the polyhydroxy compound comprises a polycaprolactone having a molecular weight of from 500 to 2,000, a hydroxy functionality of about 2, and an equivalent weight of about 260 to 1,000.

14. The composition of claim 1 wherein, in the isocyanate terminated liquid prepolymer phase, the polyhydroxy compound comprises a polyether diol or a polyether triol.

15. The composition of claim 1 wherein the isocyanate terminated liquid prepolymer has an average isocyanate functionality ranging from greater than about one to six and an average molecular weight less than 20,000.

16. The composition of claim 15 wherein the isocyanate terminated prepolymer has an average isocyanate functionality ranging from greater than about one to four and an average molecular weight less than 15,000.

17. The composition of claim 16 wherein the isocyanate terminated prepolymer has an average isocyanate functionality ranging from about two to three and an average molecular weight from 500 to 15,000.

18. A method of joining at least two substrates, which comprises (1) forming an assembly comprising at least two substrates and a sufficient bonding amount of the composition of claim 1 contacting the substrates and (2) heat curing the bond line.

19. The method of claim 18 which comprises the step of applying a primer to a surface of at least one of the substrates before forming the assembly.

20. The method of claim 18 wherein at least one substrate is made from a material different than another substrate.

21. The method of claim 18 or 19 wherein at least one substrate comprises sheet molding compound.

22. The method of claim 18 or 19 wherein at least one substrate comprises a substantially metallic substrate.

23. An article which comprises the product of the method of claim 18.

24. A method for the in-mold coating of a composite substrate which comprises forming a composite substrate in a heated mold, opening the mold, introducing an imperfection filling amount of the polyurethane composition of claim 1 into the mold, closing the mold to form a coated composite substrate and curing the coated composite substrate.

25. The method of claim 24 wherein closing the mold comprises closing the mold to force the polyurethane composition into the imperfections in the substrate in such a way that the sheet molding compound is not crushed.

26. An article which comprises the product of the method of claim 24.

27. A method of forming an article, which comprises injection molding the composition of claim 1.

28. The method of claim 27 wherein at least one filler is incorporated into the composition of claim 1 prior to injection molding.

29. An article which comprises the product of the method of claim 27.

* * * * *